March 17, 1925. 1,530,031
F. W. BRIGGS
RIM REMOVING DEVICE
Filed Oct. 15, 1923 2 Sheets-Sheet 1
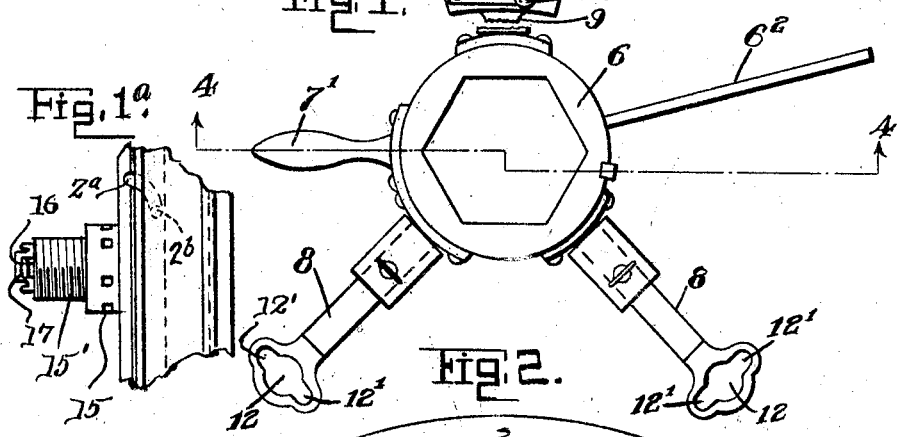
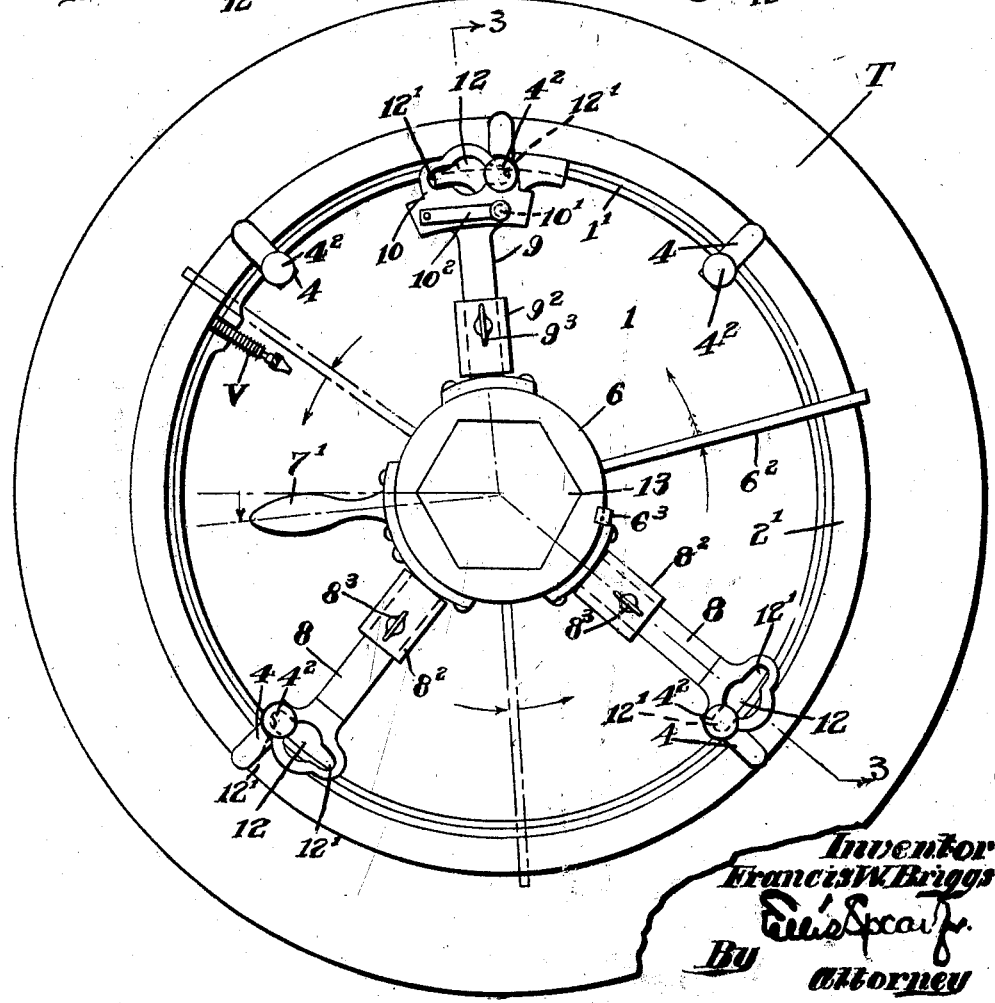
Inventor
Francis W. Briggs
By Ellis Spear Jr.
Attorney March 17, 1925.  1,530,031
F. W. BRIGGS
RIM REMOVING DEVICE
Filed Oct. 15, 1923   2 Sheets-Sheet 2
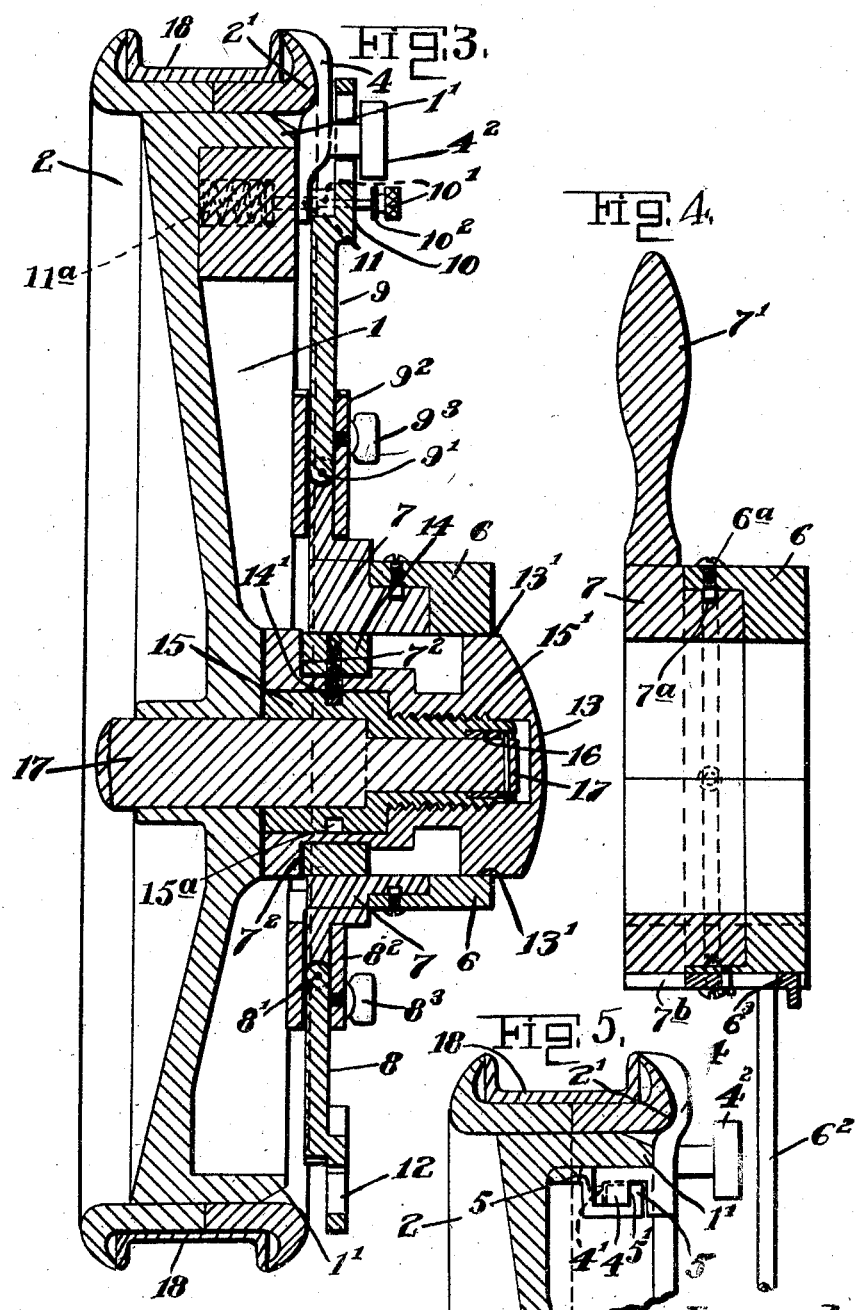
Inventor
Francis W. Briggs
By Ellis Spear Jr.
Attorney Patented Mar. 17, 1925.

1,530,031

UNITED STATES PATENT OFFICE.

FRANCIS W. BRIGGS, OF MEDFORD, MASSACHUSETTS.

RIM-REMOVING DEVICE.

Application filed October 15, 1923. Serial No. 668,595.

*To all whom it may concern:*

Be it known that I, FRANCIS W. BRIGGS, a citizen of the United States, residing at Medford, county of Middlesex, Commonwealth of Massachusetts, have invented certain new and useful Improvements in Rim-Removing Devices, of which the following is a specification.

My present invention relates to means for withdrawing a removable tire engaging rim part from a motor vehicle wheel of the type in which a rim is used having flanges for engaging the tire beads, the rim being circumferentially divided so that a part of the rim carrying one of the flanges may be removed when it is desired to repair or replace the tire.

Much difficulty has been experienced in dislodging or replacing such tires, first because the rims must of necessity have a considerable degree of stiffness, and second because under the exposure incident to use, the rims very frequently become rusted or corroded to the tire, making it necessary in many cases to use a great amount of force to free the tire from the rim. Where tires have had to be changed upon the road this has been a serious matter with the average motorist as it not only was an extremely disagreeable and dirty piece of work, but also because it was apt to involve a strain too great for the strength of the average driver and one which under the pressure of necessity he is apt to undertake, with results that might be serious.

The present invention aims to provide a tool or device by which such removal may be easily and quickly accomplished with a minimum expenditure of strength on the part of the operator and with absence of liability of soiling the clothing.

With these and other objects in view, the invention includes the novel construction hereinafter described, the nature and scope of my invention being defined and ascertained by the appended claims.

An embodiment of my invention is illustrated in the accompanying drawings, in which:—

Figure 1 is a front elevation of my improved tool or device, partly broken away to save space, and Fig. 1ª is a side elevation, partly broken away, of the hub parts, rim and assembly.

Fig. 2 is a view showing the device applied to a wheel, to aid in understanding its manner of use.

Fig. 3 is a section on line 3—3 of Fig. 2.

Fig. 4 is a section detail along the line 4—4 of Fig. 1.

Fig. 5 is a detail view of a portion of the wheel rim.

Referring by reference characters to this drawing, the wheel indicated at 1 may be of the ordinary type, with the exception of its hub cap, hereinafter more particularly described, and is shown as of the disc type, being provided with a peripheral wheel flange 1' for supporting the circumferentially divided tire engaging rim, which comprises a rim part 2 which may be permanently secured to the wheel flange, and a removable rim part 2', these having the usual flanges for engaging the beaded edges of the tire.

The removable rim part is designed to be engaged with and disengaged from the wheel flange by rotary motion in a clockwise or anti-clockwise direction respectively, which may be accomplished by providing the wheel flange with bayonet slots 2ª and the rim part with studs or projections 2ᵇ designed to engage said bayonet slots.

In a wheel using such a divided rim construction, due to the pressure of the inflated tire, it is desirable to use other means additional to the pin and bayonet slot construction referred to, for holding the removable rim part in place, a desirable form of which comprises a plurality of pairs of interengaging members 4 and 5, the former being carried by the detachable rim part 2' and the latter being secured to or carried by the inner face of the rim flange 1', as shown in Fig. 5, the cooperating faces of these lugs being inclined.

The lug members 4 are further provided with headed studs 4² designed to coact with my improved rim tool, shown detached in Figs. 1 and 4.

The detachable rim part 2' is started or given its initial movement, when it is to be removed, by the tool, which I will now describe, and which, in connection with my special hub cap, forms my improved means for withdrawing the detachable tire engaging rim part. This tool is shown in elevation in Fig. 1, and in section in Fig. 4, and it will be seen to comprise a central portion consisting of a hub member 6 and a member 7 rotatably connected therewith, preferably by having overlapping flanges, as shown in Fig. 4, the outer overlapping flange being provided with key means such as screws 6ª, tapped through the overlying flange and engaging a circumferential groove or keyway in the periphery of the underlying flange. The member 7 is provided with radial arms 8 and 9, which, except as hereinafter specified, are identical. Each of these radial arms has a laterally enlarged head which is provided with a central aperture 12 of a size to readily receive the heads of the lugs 4², and lateral recesses 12′ on each side to receive the reduced portion of the stud, such movement being effected by a rotary movement of the member 7 accomplished by the handle 7. It is customary in a wheel of the type referred to, to have means for positively locking the removable tire engaging rim part against movement to prevent its accidentally coming off while the wheel is in use on the road, and the means shown for this purpose in the drawings comprises a pin 11 which is normally projected outwardly, Fig. 3, by a spring 11ª into engagement with a recess in one of the lug members 4. It is necessary to release this pin before the removable rim part can be turned for disengagement and removal, and such releasing means comprises a pin 10′ which is slidable in an opening in the head 10, and which pin is normally held retracted or with its inner end flush with the inner face of the head, by means of a leaf spring 10². When the head 10 is brought up into lug engaging position, the pin 10′ is in alignment with the pin 11, and pressure inward on the pin 10′ will force the locking pin back out of locking position, the parts being so adjusted that the pin 10′ cannot penetrate any further than is necessary to effect the release. As soon as this release has been effected, member 7 can be rotated to start the rotary motion of the removable tire engaging rim part.

Tires as now constructed, frequently last for long periods without requiring removal from the rim, and thus tend to become rusted on, and difficult to remove, and considerable effort is necessary to pull them off. My improved removing means is capable of being used as a power jack, so to speak, and to this end I provide a special hub cap member which will now be described.

In place of the customary hub cap screwed upon the hub 15 on the axle 17 I provide a special hub cap member 13 which is internally threaded to engage the threads 15′ of the part 15, which part 15 is shown as held into the axle by the customary castle nut 16. The head 13′ is made of hexagonal shape and it is provided with a circular part adjacent its inner end which is encircled by a floating part 14 which is rotatably mounted thereon and the exterior of which is of non-circular shape corresponding to the head 13′. The bore of the members 6 and 7 is of similar non-circular shape so as to adapt the hub of the tool of Fig. 1 to be slipped onto the part 14, 15′, as shown in Figs. 2 and 3, at which time hub part 7 engages or contacts only with the floating member 14, while the part 6 engages the head 13′. The removable rim part 2′ having been disengaged from the retaining lugs by the partial rotary motion, as above described, the operator now rotates the member 6 in a counter-clockwise direction by means of the handle 6², which unscrews the member 13, or backs it off of the part 15, the result being that with a minimum expenditure of power on the part of the operator, the removable rim part is drawn wholly off from the wheel flange, this movement permitted by reason of the fact that the part 6 is rotatably connected with the part 7 of the tool, and this part 7 is lengthwise slidable on the part 14, which in turn is freely rotatable on the circular portion of the member 13. To facilitate the placing of the tool of Fig. 1 in the position shown in Fig. 3, the part 14 would be normally held within its non-circular periphery in position to coincide or align with the non-circular head 13, and similarly the parts 6 and 7 should be held with the non-circular bores in alignment. The former of these may be accomplished by providing the idling or rotatable member 14 with a spring detent 14′ yieldingly engageable with peripheral notches 15ª in the part 15, while alignment of the members 6 and 7 may be effected by a slide 6³ slidably carried by the part 6 and adapted to be moved into and out of engagement with a groove 7ᵇ in the part 7. It will be apparent that a tire having been removed in the manner hereinbefore described, it will be replaced by a reverse operation. It will also be understood that the removable rim, having been completely removed from the wheel, may be left in interlocking relation with the tool of Fig. 1, which serves as a carrier for the rim in its removal and replacement.

To enable the tool of Fig. 1 to be conveniently stored in a tool box, I preferably make the arms 8 and 9 folding by hinging them as at 8′ and 9′, and providing sliding sleeves 8² and 9² which may be clamped in position to hold the arms extended or unfolded, as shown in Fig. 3, by thumb screws 8³.

It is sometimes customary to use in a wheel of this character, a light sheet metal tire carrying rim of split ring form, indicated at 18, which is shown as merely conventional, and forms no part of the present invention.

It is obvious that various modifications and changes may be made in the above device without departing from the spirit of my invention.

What I therefore claim and desire to secure by Letters Patent is:—

1. Means for withdrawing a removable tire engaging rim part from a motor vehicle wheel comprising an internally threaded hub cap member having a non-circular head and a non-circular floating part rotatably mounted on said member, a hub member for engaging said floating part and having arms adapted to be interlocked with said tire engaging rim part, and a member rotatably connected with said hub member and adapted to engage said hub cap, and provided with means for rotating the same.

2. Means for use on a wheel structure embodying a removable rim part interlocked with said wheel by a rotary motion, and a spring detent for locking said rim part against movement, said means comprising connected arms adapted to engage and rotate said removable rim part, and a detent releasing member.

3. Means adapted for use on a wheel structure embodying a removable rim part interlocked with said wheel by a rotary motion, and a spring detent for locking said rim part against movement, said rim part having laterally extending projections, said means comprising radial arms having slotted portions for engaging said projections and a plunger for operating said detent.

4. Means for use of a wheel structure embodying a removable rim part interlocking with said wheel by a rotary motion, and a spring detent for locking said rim part against movement, said rim part having laterally extending headed projections, said means comprising radial arms having slotted portions for engaging said projections behind the heads to lock the rim flange to the wrench, and a plunger for operating said detent.

5. Means for use on a wheel structure embodying a threaded hub cap having a rotatable member and a removable rim part interlocked with said wheel by a rotary movement, and having a spring pressed locking detent, said wrench comprising a hub adapted to engage said rotatable member and having radial arms for engaging corresponding parts of said rim, said wrench having means for unlocking said detent.

6. Means for use on a wheel structure embodying a removable rim part interlocked with said wheel, and adapted to be unlocked by a relatively rotary movement, and removed by an axial movement, said means comprising a threaded hub cap member having a non-circular head and a similarly formed rotatable member, an element for engagement with said non-circular head, and an idler part rotatably carried by said element, radial arms on said idler part adapted to interlock with projections on said rim part, and means for rotating said element.

7. Means for use on a wheel structure embodying a removable tire engaging rim part comprising an internally threaded non-circular hub cap member, and a correspondingly shaped floating member carried thereby, an element having a non-circular bore to engage said hub cap member and having a rotatable part carried thereby to engage said floating member, means on said rotatable part to engage said removable rim part, and means for rotating said hub cap engaging element.

8. Means for use on a wheel structure embodying a removable tire engaging rim part comprising an internally threaded non-circular hub cap member, and a correspondingly shaped floating member carried thereby, an element having a non-circular bore to engage said hub cap member and having a rotatable part carried thereby to engage said floating member, means on said rotatable part to engage said removable rim part, means for rotating said hub cap engaging element, means for releasably aligning said floating member with the hub cap, and means for releasably aligning the said rotatable part with said element.

9. A tool for removing a divided rim from a wheel, comprising a hub cap engaging wrench member and means carried by said wrench member adapted to engage the separated rim whereby upon rotation of the hub cap by the wrench member, said rim will be drawn axially off the wheel.

10. A tool for removing a divided rim from a wheel having a threaded hub cap and an idler sleeve rotatably guided on said hub cap, comprising a wrench member having a wrench part and an idler part adapted to engage the corresponding parts of the hub cap and having radial arms on the idler part adapted to engage the idler rim whereby upon rotation of the hub cap by the wrench member said rim will be drawn axially off the wheel.

In testimony whereof I affix my signature in the presence of two witnesses.

FRANCIS W. BRIGGS.

Witnesses:
ELSIE F. DYER,
MARIAN F. WEISS.